United States Patent
Mitra et al.

(10) Patent No.: US 6,806,216 B2
(45) Date of Patent: Oct. 19, 2004

(54) ZINC-CONTAINING OPTICAL GLASS MATERIALS

(75) Inventors: Ina Mitra, Stadecken-Elsheim (DE); Danuta Grabowski, Taunusstein-Wingsbach (DE); Uwe Kolberg, Mainz-Kastel (DE); Paul Kissl, Mainz (DE)

(73) Assignee: Schott Glas, Mainz (DE)

( * ) Notice: Subject to any disclaimer, the term of this patent is extended or adjusted under 35 U.S.C. 154(b) by 151 days.

(21) Appl. No.: 09/727,998

(22) Filed: Dec. 1, 2000

(65) Prior Publication Data

US 2001/0017044 A1 Aug. 30, 2001

(30) Foreign Application Priority Data

Dec. 4, 1999 (DE) .......................................... 199 58 522

(51) Int. Cl.[7] .......................... C03C 3/07; C03C 3/102; C03C 3/105; C03C 3/108
(52) U.S. Cl. .............................. 501/60; 501/61; 501/62; 501/64; 501/74; 501/76
(58) Field of Search .............................. 501/55, 60, 61, 501/62, 64, 65–74, 76, 903

(56) References Cited

U.S. PATENT DOCUMENTS

| 2,433,883 | A | | 1/1948 | Armistead | |
|---|---|---|---|---|---|
| 4,106,946 | A | * | 8/1978 | Ritze ........................... | 501/55 |
| 4,472,030 | A | * | 9/1984 | Tachibana et al. ............ | 501/67 |
| 4,562,161 | A | | 12/1985 | Mennemann et al. | |
| 4,820,326 | A | * | 4/1989 | Speit .......................... | 65/30.11 |
| 5,059,561 | A | * | 10/1991 | Ciolek et al. ................. | 501/13 |
| 6,184,166 | B1 | * | 2/2001 | Hares et al. .................. | 501/72 |
| 6,235,667 | B1 | * | 5/2001 | Paloschi et al. .............. | 501/72 |
| 6,291,092 | B1 | * | 9/2001 | Kohli et al. .................. | 429/33 |

FOREIGN PATENT DOCUMENTS

| EP | 0673892 | 9/1995 |
|---|---|---|
| EP | 0287345 | 10/1998 |
| GB | 2233781 | 1/1991 |
| JP | 7061836 | 3/1995 |
| WO | 0009456 | 2/2000 |

OTHER PUBLICATIONS

The American Heritage Dictionary, Second College Edition. Houghton Mifflin Company, 1982, p. 346.*
Chemical Abstracts, vol. 93, No. 12, Sep. 1980, Columbus, Ohio, US; abstract No. 118922a, V. Carbol et al.: "energy saving by new glass compositions, development of low-–melting glasses . . . ", p. 255, XP002162970, Summary, & Glastek. TIDSKR., Bd. 34; Nr. 4, 1979, pp. 81–91.

* cited by examiner

*Primary Examiner*—Karl Group
(74) *Attorney, Agent, or Firm*—Nils H. Ljungman & Associates

(57) ABSTRACT

Zinc-containing optical glass materials with a refractive index $n_d$ between 1.52 and 1.66, an Abbe number $v_d$ of between 35 and 54 and a composition (in % by weight based on oxide) of: $SiO_2$ 38–58, ZnO 0.3–42, PbO 0–<30, ZnO+PbO 20–55, $Li_2O$ 0–<3, $Na_2O$ 0–14, $K_2O$ 0–12, $Li_2O+Na_2O+K_2O \geq 2$, F 0–3, MgO 0–6, CaO 0–<5, SrO 0–6, BaO 0–<0.9, $B_2O_3$ 0–<1, $Al_2O_3$ 0–<1.5 and $ZrO_2$ 0–<2 and, if appropriate, refining agents in the customary amounts.

22 Claims, No Drawings

ZINC-CONTAINING OPTICAL GLASS MATERIALS

BACKGROUND OF THE INVENTION

1. Field of the Invention

The invention relates to zinc-containing optical glass materials which have refractive indices $n_d$ of from 1.52 to 1.66 and Abbe numbers $v_d$ of from 35 to 54.

2. Background Information

During the production of optical glass materials, in addition to an accurate setting of the required optical properties and achieving a high transmission, the production costs and raw materials costs play an important role.

The latter can be achieved in particular by using inexpensive batch raw materials and by glass compositions which require relatively low melting temperatures and therefore entail lower energy costs.

A large proportion of the known glass materials which have the abovementioned optical properties (refractive indices, Abbe numbers) belong to the group of barium flint glasses. To set the desired optical properties and to achieve high transmission, substantially the high-quality and expensive raw materials from the group consisting of the alkaline earth metal oxides (BaO, SrO, CaO) and PbO are used.

Since the glass components BaO and PbO have become the subject of public discussion in terms of the environmental pollution which they cause, the manufacturers of optical equipment need optical glass materials which contain the smallest possible amounts of these components.

Partially or completely substituting one glass component with one or more other glass components does not generally allow the required optical properties to be reproduced. Instead, new developments or far-reaching changes in the glass composition are required.

The patent literature includes a number of documents which already describe glass materials with optical characteristics from the said range and with similar compositions. However, these glass materials exhibit a wide range of drawbacks:

In addition to from 7 to 30% by weight ZnO, the glass materials from Japanese document JP 85-24060 B2, with refractive indices $n_d$ of from 1.59 to 1.63 and Abbe numbers $v_d$ from 36 to 50, also contain the critical components BaO and PbO, in each case in an amount of from 1 to 21.5% by weight.

The BaO content of from 0.9 to 15.7% by weight which is provided according to SU 1534979 A1 and is absolutely necessary is to be regarded equally critically; these glass materials exhibit a refractive index $n_d$ of from 1.577 to 1.634.

Japanese document JP 89-133956 A relates to optical glass materials with refractive indices $n_d$ of between 1.51 and 1.59 and Abbe numbers $v_d$ of between 39 and 58, which, although only optionally, contain up to 44.06% by weight PbO, up to 25.34% by weight $B_2O_3$, up to 19.06% by weight SrO and up to 11.3% by weight CaO. In addition, these glass materials contain relatively large amounts of $Al_2O_3$ ranging from 4.45 to 44.10% by weight, which entails an increase in the melting temperature. Also, from 0.08 to 8.0% by weight F is absolutely imperative.

Moreover, the glass materials may contain in total up to 11.1% by weight $As_2O_3$ and $Sb_2O_3$. When these components are used in such high quantities, increased safety provisions are required during production.

At $n_d$ of $\leq 1.62$, the glass materials from document JP 89-308843 A have relatively high refractive indices, while their Abbe numbers are relatively low at $v_d \leq 37$. In addition to possible high levels of BaO, SrO and CaO, a high PbO content of some 30 to 58% by weight is absolutely imperative.

With an $n_d$ of from 1.62 to 1.85, the optical glass materials described in document JP 85-221338 A likewise exhibit relatively high refractive indices, the glass materials containing at least 1 to 50% by weight $B_2O_3$ and, if only optionally, high levels of BaO (0 to 50% by weight), SrO (0 to 40% by weight), CaO (0 to 30% by weight) and PbO (0 to 30% by weight). $B_2O_3$ reduces the chemical-durability of the glass materials.

This also applies to the optical glass materials described in document SU 97 56 17 which, in addition to a $B_2O_3$ content of from 2 to 90% by weight, also include CaO (5 to 10% by weight).

The borosilicate glass materials described in document U.S. Pat. No. 4,562,161 likewise exhibit the said optical range, but contain at least 3% by weight $B_2O_3$ and at least 4% by weight $TiO_2$, $TiO_2$ having an adverse effect on the transmission, in particular in the UV range.

German document DE 97 33 50 describes optical glass materials which cover a relatively wide range of refractive indices ($n_d$ 1.43 to 1.77) and Abbe numbers ($v_d$ 28 to 67) and therefore have broad compositional ranges. In addition to the strikingly high optional content of up to 50% by weight PbO, the glass materials contain from 0.2 to 30% by weight $TiO_2$ and from 1.0 to 12% by weight F.

In addition to the principal component $SiO_2$, the optical glass materials described in document JP 85-122747 contain a relatively high level of from 5 to 30% by weight CaO, and the high Abbe numbers $v_d$ which can be achieved lie in the range from 51 to 57.

The cesium-containing optical glass materials described in document DE 22 63 501 C2 likewise cover a range of relatively high Abbe numbers $v_d$ of from 50 to 60. The component $Cs_2O$, which is employed in an amount of between 5 and 82.5% by weight, makes the glass material considerably more expensive.

The $Al_2O_3$-containing (4–16% by weight) glass materials with a relatively low alkaline metal content ($Na_2O+K_2O$ 1 to 9.5% by weight) described in document JP 07 06 18 36 A are not used as optical glass materials, but rather for specific magnetic applications which require the components $FeO_2$ and $MnO_2$ which are described.

In the glass material which can be doped with $Er_2O_3$ according to EP 0 673 892 A2, which contains from 1.5 to 4% by weight $Al_2O_3$, $B_2O_3$ is replaced by PbO and/or $P_2O_5$ in order to improve the spectroscopic properties as optical intensifiers.

The use of $ZrO_2$, such as for example in the spectacles glass materials described in U.S. Pat. No. 2,433,833 (2 to 15% by weight $ZrO_2$) and GB 2 233 781 A (5.71 to 23.15% by weight $ZrO_2$) and in the $TiO_2$-containing optical glass materials described in EP 0 287 345 A1 (at least 2.3% by weight $ZrO_2$), increases the temperature required to melt the glass materials.

The optical glass materials described in JP 82 22 139 A contain, inter alia, 52 to 75% by weight $SiO_2$, 5 to 25% by weight ZnO and 3 to 15% by weight $Li_2O$. However, the essential feature of these glass materials is not the compositional range, but rather the refractive index which is altered by ion exchange in an $NaNO_3$ molten material.

The document JP 87-12633 A describes optical glass materials with gradually adjustable refractive indices; in these materials, substantially cesium undergoes ion exchange against zinc or against other divalent elements. The glass materials are distinguished in particular by their cesium content of approximately 2.86–66.25% by weight $Cs_2O$.

OBJECT OF THE INVENTION

The object of the invention is therefore to provide optical glass materials with a refractive index $n_d$ of from 1.52 to 1.66 and an Abbe number $v_d$ of from 35 to 54 which exhibit high transmission, high crystallization stability and good melting and processing properties and can be produced at low cost.

SUMMARY OF THE INVENTION

This object is achieved in zinc-containing optical glass materials with a refractive index of $1.52 \leq n_d \leq 1.66$ and an Abbe number of $35 \leq v_d \leq 54$, characterized by the following composition (in % by weight based on oxide) of: $SiO_2$ 38–58, ZnO 0.3–42, PbO 0–<30, ZnO+PbO 20–55, $Li_2O$ 0–<3, $Na_2O$ 0–14, $K_2O$ 0–12, $Li_2O+Na_2O+K_2O \geq 2$, F 0–3, MgO 0–6, CaO 0–$\geq$5, SrO 0–6, BaO 0–<0.9, $B_2O_3$ 0–<1, $Al_2O_3$ 0–<1.5 and $ZrO_2$ 0–<2 and, if appropriate, refining agents in the customary amounts.

DESCRIPTION OF THE PREFERRED EMBODIMENT

The glass materials contain, as network former, from 38 to 58% by weight $SiO_2$; if the $SiO_2$ content rises to above 58% by weight, the melting temperature rises disadvantageously while the refractive indices are significantly reduced.

In addition to $SiO_2$, ZnO, in an amount of from 0.3 to 42% by weight, forms the principal component of the glass materials. Together with PbO, the level of which is restricted to from 0 to <30% by weight, ZnO acts as both a network former and a network modifier.

The total ZnO and PbO content is in the range from 20 to 55% by weight. Preferably the total ZnO and Pbo content is in the range from >21 to 55% by weight. With high ZnO and PbO contents, high refractive indices $n_d$ are established. Varying the ZnO to PbO ratio is used to set the Abbe numbers; low Abbe numbers are achieved with high levels of PbO.

The fact that the glass materials are easy to melt is attributable to their total $Li_2O$, $Na_2O$ and $K_2O$ content of at least 2% by weight, the $Li_2O$ content being restricted to 0 to <3% by weight, the $Na_2O$ content being restricted to 0 to 14% by weight, and the $K_2O$ content being restricted to 0 to 12% by weight.

It is possible to add small amounts of $Al_2O_3$ (0 to <1.5% by weight) and $B_2O_3$ (0 to <1% by weight) which likewise reduce the melting temperatures. However, excessively high $Al_2O_3$ contents cause the meltability to deteriorate. Elevated $B_2O_3$ contents have an adverse effect on the chemical durability, in particular with respect to media containing alkaline metals.

High-melting components are substantially eliminated. For example, the $ZrO_2$ content is limited to 0 to <2% by weight.

In subordinate amounts, the glass materials, in particular in order to fine tune their optical properties, may contain from 0 to 6% by weight MgO, from 0 to <5% by weight CaO, from 0 to 6% by weight SrO and/or from 0 to <0.9% by weight BaO, the glass materials preferably containing from 0 to <0.5% by weight BaO and particularly preferably being substantially free from BaO. The total CaO and SrO content is preferably in the range from 0 to 5% by weight.

Furthermore, from 0 to 3% by weight F is provided. The ranges of the optical data exhibited by the glass materials are restricted in accordance with the restrictions on the particular ranges of the components.

For example, glass materials with refractive indices $n_d$ of from 1.54 to 1.64 and Abbe numbers $v_d$ of from 40 to 52 are obtained within the following compositional range (in % by weight based on oxide): $SiO_2$ 39–54, ZnO 12–41, PbO 6–22, ZnO+PbO 31–52, $Li_2O$ 0–<3, $Na_2O$ 0–13, $K_2O$ 0–11, $Li_2O+Na_2O+K_2O \geq 2$, F 0–3, MgO 0–6, CaO 0–<5, SrO 0–6, BaO 0–<0.9, $B_2O_3$ 0–<1, $Al_2O_3$ 0–<1.5 and $ZrO_2$ 0–<2.

Glass materials with refractive indices $n_d$ of between 1.56 and 1.63 and Abbe numbers $v_d$ of between 42 and 52 are within the following compositional range (in % by weight based on oxide): $SiO_2$ 40–55, preferably $SiO_2$ 40–53, ZnO 26–41, preferably ZnO 28–41, PbO 1–16, ZnO+PbO 31–48, $Li_2O$ 0–<3, $Na_2O$ 0–12, $K_2O$ 0–10, $Li_2O+Na_2O+K_2O \geq 2$, F 0–3, MgO 0–6, CaO 0–<5, SrO 0–6, BaO 0–<0.9, $B_2O_3$ 0–<1, $Al_2O_3$ 0–<1.5 and $ZrO_2$ 0–<2.

Refractive indices $n_d$ from 1.60 to 1.63 and Abbe numbers $v_d$ of from 43 to 47 are obtained with glass materials within the following compositional range (in % by weight based on oxide): $SiO_2$ 40–47, ZnO 32–41, PbO 5–14, ZnO+PbO 40–48, $Li_2O$ 0–<3, $Na_2O$ 0–14 preferably 0–13 and particularly preferably 0–12, $K_2O$ 0–12 preferably 0–11 and particularly preferably 0–10, $Li_2O+Na_2O+K_2O \geq 2$, F 0–3, MgO 0–6, CaO 0–<5, SrO 0–6, BaO 0–<0.9, $B_2O_3$ 0–<1, $Al_2O_3$ 0–<1.5 and $ZrO_2$ 0 –<2.

Glass materials from the compositional range (% by weight based on oxide): $SiO_2$ 41–50, ZnO 30–40, PbO 0–1, ZnO+PbO 31–41, $Li_2O$ 0–<3, $Na_2O$ 0–11, $K_2O$ 0–10, $Li_2O+Na_2O+K_2O \geq 2$, F 0–3, MgO 0–6, CaO 0–<5, SrO 0–6, BaO 0–<0.9, $B_2O_3$ 0–<1, $Al_2O_3$ 0–<1.5 and $ZrO_2$ 0–<2, have refractive indices $n_d$ of between 1.57 and 1.59 and Abbe numbers $v_d$ of between 48 and 52.

To vary and precisely adapt the optical properties, the glass materials may contain up to 2.5% by weight $Cs_2O$ and/or up to 5% by weight $Rb_2O$, $La_2O_3$, $Y_2O_3$ and/or $GeO_2$.

The optical glass materials claimed preferably have a very high pure transmission of at least 0.98, determined for a wavelength of 400 nm and a specimen thickness of 25 mm.

A further advantage of the glass materials according to the invention is their neutral colour. Therefore, if preferably up to 8% by weight of colouring components are added to the glass compositions described, the characteristic spectrum of the colouring components used, such as for example CuO, $Cr_2O_3$, CoO, $Fe_2O_3$, MnO, NiO and/or $V_2O_5$, are particularly valid.

Optical glass materials which have been coloured in this way are used, for example, as optical filters.

To improve the quality of the glass, it is possible for one or more known refining agents to be added in the customary amounts to the batch, in order to refine the glass material. As a result, the glass material has a particularly good internal quality in terms of its freedom from bubbles and cords.

Preferred refining agents are $Sb_2O_3$ and/or $As_2O_3$ the level of which should be restricted to at most 1% by weight, preferably 0.5% by weight.

In addition to the desired optical properties, the glass materials according to the invention have the following qualities:

It has been possible to substantially minimize the use of the previously customary but relatively expensive glass components BaO, SrO and CaO. In particular, it was possible to further minimize the use of the critical components BaO and PbO.

This was achieved by introducing the inexpensive, ecologically tolerable component ZnO.

Furthermore, the glass materials exhibit good crystallization stability; furthermore they are not only easy to process, but also can be melted with ease.

The glass materials exhibit a sufficiently high chemical durability. The chemical durability is important in particular for the further machining of the materials, for example grinding and polishing.

The above-discussed embodiments of the present invention will be described further hereinbelow. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

EXAMPLES 24 examples of glass materials according to the invention were melted from standard raw materials.

The glass materials described were produced as follows: the raw materials for the oxides, which in some cases were used in the form of carbonates and/or nitrates, were mixed and melted at 1300–1350° C. The refining took place at temperatures of between 1300 and 1400° C. This was followed by a good level of homogenization. Casting of the glass material into the desired shape was carried out at 1220–1270° C.

Table 2 lists the respective composition (in % by weight based on oxide), the refractive index $n_d$, the Abbe number $v_d$ and the pure transmission $\tau_i$ for a wavelength of 400 nm and a specimen thickness of 25 mm.

In a comparison between a standard barium flint glass of similar optical properties, such as for example BaFN$_6$ (with $n_d$=1.589 and $v_d$=48.45) in accordance with the SCHOTT catalogue with a pure transmission of $\tau_{i,400\ nm}$=0.93, and Example 15 (with $n_d$=1.59 and $v_d$=48.4) with a pure transmission of $\tau_{i,400\ nm}$=0.99, the improved transmission of the glass materials according to the invention becomes clear.

Table 1 shows an example of how to melt the composition for Example 6 listed in Table 2.

For Example 6, the devitrification behaviour was also determined. This showed that, as the temperature rose, there was no crystallization even after tempering for 60 min in a temperature range from 650 to 1050° C.

TABLE 1

Example of how to melt 100 kg of calculated glass (Example 6, Table 2)

| Oxide | % by weight | Raw material | Weighed-in quantity [kg] |
|---|---|---|---|
| SiO$_2$ | 50.5 | SiO$_2$ | 50.70 |
| ZnO | 4.8 | ZnO | 4.85 |
| PbO | 28.2 | Pb$_3$O$_4$ | 28.96 |
| Na$_2$O | 6.7 | Na$_2$CO$_3$ | 11.46 |
| K$_2$O | 9.6 | K$_2$CO$_3$ | 14.06 |
| As$_2$O$_3$ | 0.2 | As$_2$O$_2$ | 0.20 |
| Sum | 100.0 | | 110.23 |

TABLE 2

Glass composition (in % by weight based on oxide) and significant properties of the glass materials

| Example | 1 | 2 | 3 | 4 | 5 | 6 | 7 | 8 | 9 | 10 |
|---|---|---|---|---|---|---|---|---|---|---|
| SiO$_2$ | 52.1 | 54.6 | 40.0 | 54.8 | 40.5 | 50.5 | 53.0 | 41.0 | 50.9 | 46.4 |
| ZnO | 3.0 | 22.0 | 3.0 | 34.6 | 21.0 | 4.0 | 10.0 | 34.9 | 17.6 | 27.0 |
| PbO | 20.4 | 1.0 | 29.0 | 1.9 | 29.0 | 20.2 | 23.9 | 15.5 | 19.4 | 10.1 |
| Li$_2$O | — | — | 2.0 | — | — | — | — | — | — | — |
| Na$_2$O | 6.6 | 11.6 | 13.0 | 5.2 | 5.2 | 6.7 | 5.9 | 5.2 | 0.2 | 9.8 |
| K$_2$O | 0.9 | 9.0 | 12.0 | 3.3 | 3.3 | 9.6 | 6.2 | 3.2 | 3.7 | 6.5 |
| B$_2$O$_3$ | — | — | — | — | — | — | — | — | — | — |
| Al$_2$O$_3$ | — | — | — | — | — | — | — | — | — | — |
| As$_2$O$_3$ | 0.2 | 0.2 | 0.2 | 0.2 | 0.2 | 0.2 | 0.2 | 0.2 | 0.2 | 0.2 |
| ZnO + PbO | 32.2 | 23.0 | 32.0 | 36.5 | 50.0 | 33.0 | 33.9 | 50.4 | 37 | 37.1 |
| $n_d$ | 1.57 | 1.54 | 1.61 | 1.57 | 1.64 | 1.57 | 1.57 | 1.63 | 1.50 | 1.50 |
| $v_d$ | 42.0 | 52.0 | 37.7 | 51.9 | 30.1 | 42.0 | 44.7 | 42.3 | 45.0 | 47.2 |
| $\tau_{1400\ nm,\ 25\ nm}$ | 0.997 | nd. | n.d. | n.d. | n.d. | 0.990 | 0.996 | n.d. | 0.997 | 0.992 |

| Example | 11 | 12 | 13 | 14 | 15 | 16 | 17 | 18 | 19 |
|---|---|---|---|---|---|---|---|---|---|
| SiO$_2$ | 42.75 | 45.0 | 44.6 | 46.8 | 47 | 44.95 | 43.7 | 44.9 | 48 |
| ZnO | 33.75 | 29.5 | 37.5 | 34 | 34.8 | 31.8 | 29.1 | 31 | 32 |
| PbO | 3.0 | 8.0 | 1.3 | 4 | 5 | 7.85 | 7 | 7.4 | 3.2 |
| Li$_2$O | — | — | — | 1.4 | — | — | — | — | — |

TABLE 2-continued

Glass composition (in % by weight based on oxide) and significant properties of the glass materials

| | | | | | | | | | |
|---|---|---|---|---|---|---|---|---|---|
| Na$_2$O | 10.7 | 9.0 | 9.4 | 9.6 | 7.1 | 7.95 | 8.1 | 8.4 | 6.4 |
| K$_2$O | 9.6 | 7.5 | 7.0 | 4 | 4.1 | 5 | 8 | 5.2 | 9.8 |
| As$_2$O$_3$ | 0.2 | 0.2 | 0.2 | 0.2 | 0.2 | 0.25 | 0.2 | 0.2 | 0.2 |
| MgO | — | — | — | — | 1.8 | — | — | — | — |
| CaO | — | — | — | — | — | 2.2 | — | — | — |
| B$_2$O$_3$ | — | — | — | — | — | — | — | — | — |
| Al$_2$O$_3$ | — | — | — | — | — | — | — | — | — |
| Y$_2$O$_3$ | — | — | — | — | — | — | 3.9 | — | — |
| GeO$_2$ | — | — | — | — | — | — | — | 2.9 | — |
| F | — | — | — | — | — | — | — | — | 0.4 |
| ZnO + PbO | 36.75 | 37.5 | 38.8 | 38 | 39.8 | 39.65 | 36.1 | 38.4 | 35.2 |
| n$_d$ | 1.58 | 1.58 | 1.58 | 1.58 | 1.59 | 1.59 | 1.59 | 1.59 | 1.57 |
| v$_d$ | 48.0 | 48.0 | 50.1 | 48.9 | 48.4 | 47.1 | 48.0 | 47.3 | 50.5 |
| τ$_{1400\,nm,\,25\,nm}$ | n.d. | 0.989 | 0.991 | 0.985 | 0.990 | n.d. | 0.984 | n.d. | n.d. |

| Example | 20 | 21 | 22 | 23 | 24 |
|---|---|---|---|---|---|
| SiO$_2$ | 42 | 42.4 | 44.7 | 46.8 | 47.0 |
| ZnO | 34.9 | 38.6 | 39.9 | 38.6 | 38.2 |
| PbO | 12.5 | 8 | | | |
| Na$_2$O | 7.2 | 7 | 7.9 | 7.4 | 8.2 |
| K$_2$O | 3.2 | 3.8 | 7.3 | 6.4 | 5.7 |
| As$_2$O$_3$ | 0.2 | 0.2 | 0.2 | 0.2 | 0.2 |
| B$_2$O$_3$ | — | — | — | 0.6 | — |
| Al$_2$O$_3$ | — | — | — | — | 0.7 |
| ZnO + PbO | 47.4 | 46.6 | 39.9 | 38.6 | 38.2 |
| n$_d$ | 1.61 | 1.61 | 1.58 | 1.58 | 1.58 |
| V$_d$ | 44.1 | 45.8 | 50.4 | 50.6 | 50.5 |
| τ$_{1400\,nm,\,25nm}$ | 0.999 | 0.997 | 0.985 | 0.997 | 0.991 |

One feature of the invention resides broadly in the zinc-containing optical glass materials with a refractive index of $1.52 \leq n_d \leq 1.66$ and an Abbe number of $35 \leq v_d \leq 54$, characterized by the following composition (in % by weight based on oxide)

| | |
|---|---|
| SiO$_2$ | 38–58 |
| ZnO | 0.3–42 |
| PbO | 0–<30 |
| with ZnO + PbO | 20–55 |
| Li$_2$O | 0–<3 |
| Na$_2$O | 0–14 |
| K$_2$O | 0–12 |
| with Li$_2$O + Na$_2$O + K$_2$O | ≧2 |
| F | 0–3 |
| MgO | 0–6 |
| CaO | 0–<5 |
| SrO | 0–6 |
| BaO | 0–<0.9 |
| B$_2$O$_3$ | 0–<1 |
| Al$_2$O$_3$ | 0–<1.5 |
| ZrO$_2$ | 0–<2 | and, if appropriate, refining agents in the customary amounts.

Another feature of the invention resides broadly in the optical glass materials with a refractive index of $1.54 \leq n_d \leq 1.64$ and an Abbe number of $40 \leq v_d \leq 52$, characterized by the following composition (in % by weight based on oxide)

| | |
|---|---|
| SiO$_2$ | 39–54 |
| ZnO | 12–41 |
| PbO | 6–22 |
| with ZnO + PbO | 31–52 |
| Li$_2$O | 0–<3 |
| Na$_2$O | 0–13 |
| K$_2$O | 0–11 |
| with Li$_2$O + Na$_2$O + K$_2$O | |
| F | 0–3 |
| MgO | 0–6 |
| CaO | 0–<5 |
| SrO | 0–6 |
| BaO | 0–<0.9 |
| B$_2$O$_3$ | 0–<1 |
| Al$_2$O$_3$ | 0–<1.5 |
| ZrO$_2$ | 0–<2 | and, if appropriate, refining agents in the customary amounts.

Yet another feature of the invention resides broadly in the optical glass materials with a refractive index of $1.56 \leq n_d \leq 1.63$ and an Abbe number of $42 \leq v_d \leq 52$, characterized by the following composition (in % by weight based on oxide)

| | |
|---|---|
| SiO$_2$ | 40–55 |
| ZnO | 26–41 |
| PbO | 1–16 |
| with ZnO + PbO | 31–48 |
| Li$_2$O | 0–<3 |
| Na$_2$O | 0–12 |
| K$_2$O | 0–10 |
| with Li$_2$O + Na$_2$O + K$_2$O | ≧2 |
| F | 0–3 |
| MgO | 0–6 |
| CaO | 0–<5 |
| SrO | 0–6 |

-continued

| | |
|---|---|
| BaO | 0–<0.9 |
| $B_2O_3$ | 0–<1 |
| $Al_2O_3$ | 0–<1.5 |
| $ZrO_2$ | 0–<2 | and, if appropriate, refining agents in the customary amounts.

Still another feature of the invention resides broadly in the optical glass materials with a refractive index of $1.60 \leq n_d \leq 1.63$ and an Abbe number of $43 \leq v_d \leq 47$, characterized by the following composition (in % by weight based on oxide)

| | |
|---|---|
| $SiO_2$ | 40–47 |
| ZnO | 32–41 |
| PbO | 5–14 |
| with ZnO + PbO | 40–48 |
| $Li_2O$ | 0–<3 |
| $Na_2O$ | 0–12 |
| $K_2O$ | 0–10 |
| with $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 | and, if appropriate, refining agents in the customary amounts.

A further feature of the invention resides broadly in the optical glass materials with a refractive index of $1.57 \leq n_d \leq 1.59$ and an Abbe number of $48 \leq v_d \leq 52$, characterized by the following composition (in % by weight based on oxide)

| | |
|---|---|
| $SiO_2$ | 41–50 |
| ZnO | 30–40 |
| PbO | 0–1 |
| with ZnO + PbO | 31–41 |
| $Li_2O$ | 0–<3 |
| $Na_2O$ | 0–11 |
| $K_2O$ | 0–10 |
| with $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2. | and, if appropriate, refining agents in the customary amounts.

Another feature of the invention resides broadly in the optical glass materials characterized in that the glass materials contain up to 5% by weight $Rb_2O$, $La_2O_3$, $Y_2O_3$, and/or $GeO_2$.

Yet another feature of the invention resides broadly in the optical glass materials characterized in that the glass materials contain up to at most 2.5% by weight $Cs_2O$.

Still another feature of the invention resides broadly in the optical glass materials characterized in that the pure transmission of the glass materials, determined at 400 nm and 25 mm specimen thickness, is at least 0.98.

A further feature of the invention resides broadly in the optical glass materials characterized in that the glass materials contain up to 8% by weight of coloring components.

Another feature of the invention resides broadly in the optical glass materials characterized in that the glass materials contain in total up to 1% by weight $As_2O_3$ and/or $Sb_2O_3$.

In accordance with one aspect, the present invention concerns a zinc-containing optical glass with a refractive index ($n_d$) being substantially in the range of from about 1.52 to about 1.66 and an Abbe number ($v_d$) being substantially in the range of from about 35 to about 54, said zinc-containing optical glass substantially comprising, on an oxide basis, the composition of:

| Material | Percentage by weight |
|---|---|
| $SiO_2$ | 38–58 |
| ZnO | 0.3–42 |
| PbO | 0–<30 |
| with ZnO + PbO | 20–55 |
| $Li_2O$ | 0–<3 |
| $Na_2O$ | 0–14 |
| $K_2O$ | 0–12 |
| with $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0 |
| $ZrO_2$ | 0–<2. |

In accordance with another aspect, the invention concerns a zinc-containing optical glass with a refractive index ($n_d$) being substantially in the range of from about 1.57 to about 1.59 and an Abbe number ($v_d$) being substantially in the range of from about 48 to about 52, said zinc-containing optical glass substantially comprising, on an oxide basis, the composition of:

| Material | Percentage by weight |
|---|---|
| $SiO_2$ | 41–50 |
| ZnO | 30–40 |
| PbO | 0–1 |
| with ZnO + PbO | 31–41 |
| $Li_2O$ | 0–<3 |
| $Na_2O$ | 0–11 |
| $K_2O$ | 0–10 |
| with $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |

In accordance with a further aspect of the invention there is provided a method of forming zinc-containing optical glass which consists of, on an oxide basis:

| Material | Percentage by weight |
| --- | --- |
| $SiO_2$ | 38–58 |
| ZnO | 0.3–42 |
| PbO | 0–<30 |
| with ZnO + PbO | 20–55 |
| $Li_2O$ | 0–<3 |
| $Na_2O$ | 0–14 |
| $K_2O$ | 0–12 |
| with $Li_2O$ + $Na_2O$ + $K_2O$ | ≧2 |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 | said zinc-containing optical glass having a refractive index ($n_d$) substantially in the range of from about 1.52 to about 1.66 and an Abbe number ($v_d$) substantially in the range of from about 35 to about 54, said method including the steps of:

(a) mixing and melting raw materials comprising said oxides to form a batch of glass;

(b) heating a batch of glass obtained in accordance with step (a) to produce a melt of zinc-containing optical glass;

(c) refining said melt obtained in accordance with step (b) with a at least one refining agent, said refining agent being added in an amount sufficient to refine said zinc-containing optical glass.

Zinc-containing optical glass in accordance with the present invention may, for example, have any value of refractive index ($n_d$) in the range of from about 1.52 to about 1.66, for example, 1.53 and 1.65. Thus, the value of refractive index ($n_d$) is not limited to the first and final values of the range, but can comprise any value of refractive index ($n_d$) between them.

The zinc-containing optical glass in accordance with the present invention may, for example, have any Abbe number ($v_d$) in the range of from about 35 to about 54, for example, 36 and 53. Accordingly, the Abbe number ($v_d$) is not limited to the first and final values of the range, but can comprise any value between them.

Zinc-containing optical glass of the present invention may, for example, have a zinc content, in percent by weight based on oxide, in the range of from about 0.3 to about 42 percent by weight, for example, 0.4 and 41.9. Thus, the amount of zinc content, in percent by weight based on oxide, is not limited to the first and final values of the indicated range, but can comprise any value between them.

The zinc-containing optical glass of the invention may, for example, have a ZnO plus PbO content in the range of from about 21 to about 55 percent by weight based on oxide, for example, 21.5 and 54.5. Accordingly, the content of ZnO plus PbO, by weight based on oxide, is not limited to the first and final values of the indicated range, but can comprise any value between them.

The zinc-containing optical glass in accordance with our invention can comprise a total content of CaO plus SrO in the range of from 0 to about 5 percent by weight based on oxide, for example, 0.5 and 4.9. Thus, the content of CaO plus SrO, by weight based on oxide, is not to be limited to the first and final values of the indicated range, but can comprise any value between them.

Other components of the composition of the zinc-containing optical glass of the present invention are likewise not limited to the first and final values of the indicated range, but can comprise any value between them.

The features disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign application, namely, Federal Republic of Germany Patent Application No. 199 58 522.9, filed on Dec. 4, 1999, having inventors Dr. Ina MITRA, Danuta GRABOWSKI, Dr. Uwe KOLBERG, and Paul KIBL, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The details in the patents, patent applications and publications may be considered to be incorporable, at Applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Examples of optical glass containing zinc and the use thereof may be found in U.S. Pat. No. 5,754,290 issued on May 19, 1998 to Rajic, et al. and entitled "Monolithic spectrometer"; U.S. Pat. No. 5,524,133 issued on Jun. 4, 1996 to Neale, et al. and entitled "Material identification using x-rays"; U.S. Pat. No. 5,356,840 issued on Oct. 18, 1994 to Noda and entitled "Distributed index of refraction type optical element and method of making the same"; U.S. Pat. No. 4,981,331 issued on Jan. 1, 1991 to Taylor and entitled "Low reflection optical reticle and method of making same"; and U.S. Invention Registration No. H158 published on Nov. 4, 1986 to Fraustro, et al. and entitled "Method of bonding an electrically conductive material to an electrically conductive layer which overlies a curved non-metallic substrate".

Examples optical glass including the manufacture, shaping and use thereof may be found in U.S. Pat. No. 6,127,297 issued on Oct. 3, 2000 to Hashimoto and entitled "Optical glass having a low specific gravity"; U.S. Pat. No. 5,824,615 issued on Oct. 20, 1998 to Chang and entitled "Optical glass composition for precise press molding"; U.S. Pat. No. 5,735,920 issued on Apr. 7, 1998 to Omori, et al. and entitled "Method of manufacturing optical glass element"; U.S. Pat No. 5,607,886 issued on Mar. 4, 1997 to Onozawa and entitled "Optical glass for mold pressing having softening capability at low temperature"; U.S. Pat. No. 5,472,918 issued on Dec. 5, 1995 to Onozawa and entitled "Optical glass"; U.S. Pat. No. 5,346,522 issued on Sep. 13, 1994 to Komiyama, et al. and entitled "Method and apparatus for molding optical glass elements or the like"; U.S. Pat. No. 5,332,700 issued on Jul. 26, 1994 to Yamaguchi, et al. and entitled "High dispersion optical glass"; U.S. Pat. No. 5,320,987 issued on Jun. 14, 1994 to Senoo, et al. and entitled "Optical glass"; U.S. Pat. No. 5,217,516 issued on Jun. 8, 1993 to Ishiguro, et al. and entitled "Method of making optical glass article"; U.S. Pat. No. 5,087,279 issued on Feb. 11, 1992 to Monji, et al. and entitled "Method of producing optical glass element and production apparatus using this method"; U.S. Pat. No. 5,022,904 issued on Jun. 11, 1991 to Ishiguro et al. and entitled "Method of making optical glass article"; U.S. Pat. No. 4,996,173 issued on Feb. 26, 1991 to Tachiwara and entitled "Optical glass"; U.S. Pat. No. 4,771,020 issued on Sep. 13, 1988 to Omata et al. and entitled "Optical glass"; U.S. Pat. No. 4,732,875 issued on Mar. 22, 1988 to Sagara and entitled "Optical glass"; U.S. Pat. No. 4,481,299 issued on Nov. 6, 1984 to Tajima and entitled "Optical glass"; U.S. Pat. No. 4,472,030 issued on Sep. 18, 1984 to Tachibana et al. and entitled "Cesium-containing optical glass"; U.S. Pat. No. 4,439,530 issued on Mar. 27, 1984 to Tajima and entitled "Optical glass"; U.S. Pat. No. 4,426,216 issued on January 17, 1984 to Sato, et al. and entitled "Process for producing optical glass"; U.S. Pat. No. 4,144,076 issued on Mar. 13, 1979 to Matsumaru and entitled "Optical glass"; U.S. Pat. No. 4,128,432 issued on Dec. 5, 1978 to Komorita and entitled "Optical glass"; U.S. Pat. No. 4,119,471 issued on Oct. 10, 1978 to Komorita et al. and entitled "Optical glass"; U.S. Pat. No. 4,115,131 issued on Sep. 19, 1978 to Ishibashi et al. and entitled "Optical glass"; U.S. Pat. No. 3,958,999 issued on May 25, 1976 to Izumitani, et al. and entitled "Optical glass"; and U.S. Pat. No. 3,954,431 issued on May 4, 1976 to Fleming, Jr. et al. and entitled "Optical glass and its production".

Optical glass fiber examples may be found in U.S. Pat. No. 6,004,675 issued on Dec. 21, 1999 to Akasaka et al. and entitled "Optical glass fiber"; U.S. Pat. No. 4,345,036 issued on Aug. 17, 1982 to Bamford et al. and entitled "Optical glass fibers and method of forming such fibers"; U.S. Pat. No. 4,297,141 issued on Oct. 27, 1981 to Tokunaga et al. and entitled "Optical glass for optical paths"; U.S. Pat. No. 4,159,863 issued on Jul. 3, 1979 to Stewart and entitled "Coupling of optical glass fibers"; and U.S. Pat. No. 4,145,200 issued on Mar. 20, 1979 to Yamazaki et al. and entitled "Production of optical glass fibers".

This invention as described hereinabove in the context of the preferred embodiments is not to be taken as limited to all of the provided details thereof, since modifications and variations thereof may be made without departing from the spirit and scope of the invention.

What is claimed is:

1. A zinc-containing optical glass with a refractive index ($n_d$) being in the range of from about 1.60 to about 1.63 and an Abbe number ($v_d$) being in the range of from about 43 to about 47, said zinc-containing optical glass comprising, on an oxide basis, the composition of:

| Material | Percentage by weight |
| --- | --- |
| $SiO_2$ | 40–47 |
| ZnO | 32–41 |
| PbO | 5–14 |
| sum of ZnO + PbO | 40–48 |
| $Li_2O$ | 0–<3 |
| $Na_2O$ | 0–12 |
| $K_2O$ | 0–10 |
| sum of $Li_2O$ + $Na_2O$ + $K_2O$ | ≧2 |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2. |

2. A zinc-containing optical glass with a refractive index ($n_d$) being in the range of from about 1.54 to about 1.64 and an Abbe number ($v_d$) being in the range of from about 40 to about 52, said zinc-containing optical glass consisting of, on an oxide basis, the composition of:

| Material: | Percentage by weight |
| --- | --- |
| $SiO_2$ | 39–54 |
| ZnO | 12–41 |
| PbO | 6–22 |
| sum of ZnO + PbO | 31–52 |
| $Li_2O$ | 0–<3 |
| $Na_2O$ | 0–13 |
| $K_2O$ | 0–11 |
| sum of $Li_2O$ + $Na_2O$ + $K_2O$ | ≧2 |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2. |

≧0% by weight of at least one refining agent.

3. A zinc-containing optical glass with a refractive index ($n_d$) being in the range of from about 1.56 to about 1.63 and an Abbe number ($v_d$) being in the range of from about 42 to about 52, said zinc-containing optical glass consisting of, on an oxide basis, the composition of:

| Material | Percentage by weight |
| --- | --- |
| $SiO_2$ | 40–55 |
| ZnO | 26–41 |
| PbO | 1–16 |
| sum of ZnO + PbO | 31–48 |
| $Li_2O$ | 0–<3 |
| $Na_2O$ | 0–12 |
| $K_2O$ | 0–10 |
| sum of $Li_2O$ + $Na_2O$ + $K_2O$ | ≧2 |
| F | 0–3 |
| MgO | 0–6 |
| CaO | 0–<5 |
| SrO | 0–6 |
| BaO | 0–<0.9 |

-continued

| Material | Percentage by weight |
|---|---|
| $B_2O_3$ | 0–<1 |
| $Al_2O_3$ | 0–<1.5 |
| $ZrO_2$ | 0–<2 |

$\geq 0\%$ by weight of at least one refining agent.

4. A zinc-containing optical glass with a refractive index ($n_d$) being in the range of from about 1.60 to about 1.63 and an Abbe number ($v_d$) being in the range of from about 43 to about 47, said zinc-containing optical glass consisting of, on an oxide basis, the composition of:

| Material | Percentage by weight |
|---|---|
| $SiO_2$ | 40–47 |
| ZnO | 32–41 |
| PbO | 5–14 |
| sum of ZnO + PbO | 40–48 |
| $Li_2O$ | 0–<3 |
| $Na_2O$ | 0–12 |
| $K_2O$ | 0–10 |
| sum of $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |

$\geq 0\%$ by weight of at least one refining agent.

5. A zinc-containing optical glass with a refractive index ($n_d$) being in the range of from about 1.57 to about 1.59 and an Abbe number ($v_d$) being in the range of from about 48 to about 52, said zinc-containing optical glass consisting of, on an oxide basis, the composition of:

| Material | Percentage by weight |
|---|---|
| $SiO_2$ | 41–50 |
| ZnO | 30–40 |
| PbO | 1–1 |
| sum of ZnO + PbO | 31–41 |
| $Li_2O$ | 0–<3 |
| $Na_2O$ | 0–11 |
| $K_2O$ | 0–10 |
| sum of $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |

$\geq 0\%$ by weight of at least one refining agent.

6. A zinc-containing optical glass with a refractive index ($n_d$) being in the range of from about 1.54 to about 1.64 and an Abbe number ($v_d$) being in the range of from about 40 to about 52, said zinc-containing optical glass consisting of, on an oxide basis, the composition of:

| Material | Percentage by weight |
|---|---|
| $SiO_2$ | 39–54 |
| ZnO | 12–41 |
| PbO | 6–22 |
| sum of ZnO + PbO | 31–52 |
| $Li_2O$ | 0–<3 |
| $Na_2O$ | 0–13 |
| $K_2O$ | 0–11 |
| sum of $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |
| $Cs_2O$ | 0 to about 2.5; |

0 to about 5% by weight of one member of the group and combinations thereof: $Rb_2O$, $La_2O_3$, $Y_2O_3$, and $GeO_2$;

$\geq 0\%$ by weight of a coloring component; and $\geq 0\%$ by weight of at least one refining agent.

7. A zinc-containing optical glass with a refractive index ($n_d$) being in the range of from about 1.56 to about 1.63 and an Abbe number ($v_d$) being in the range of from about 42 to about 52, said zinc-containing optical glass consisting of, on an oxide basis, the composition of:

| Material | Percentage by weight |
|---|---|
| $SiO_2$ | 40–55 |
| ZnO | 26–41 |
| PbO | 1–16 |
| sum of ZnO + PbO | 31–48 |
| $Li_2O$ | 0–<3 |
| $Na_2O$ | 0–12 |
| $K_2O$ | 0–10 |
| sum of $Li_2O + Na_2O + K_2O$ | $\geq 2$ |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |
| $Cs_2O$ | 0 to about 2.5; |

0 to about 5% by weight of one member of the group and combinations thereof: $Rb_2O$, $La_2O_3$, $Y_2O_3$, and $GeO_2$;

$\geq 0\%$ by weight of a coloring component; and $\geq 0\%$ by weight of at least one refining agent.

8. A zinc-containing optical glass with a refractive index ($n_d$) being in the range of from about 1.60 to about 1.63 and an Abbe number ($v_d$) being in the range of from about 43 to about 47, said zinc-containing optical glass consisting of, on an oxide basis, the composition of:

| Material | Percentage by weight |
|---|---|
| $SiO_2$ | 40–47 |
| ZnO | 32–41 |
| PbO | 5–14 |
| sum of ZnO + PbO | 40–48 |
| $Li_2O$ | 0–<3 |
| $Na_2O$ | 0–12 |
| $K_2O$ | 0–10 |
| sum of $Li_2O + Na_2O + K_2O$ | ≧2 |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |
| $Cs_2O$ | 0 to about 2.5; |

0 to about 5% by weight of one member of the group and combinations thereof: $Rb_2O$, $La_2O_3$, $Y_2O_3$, and $GeO_2$;
≧0% by weight of a coloring component; and
≧0% by weight of at least one refining agent.

9. A zinc-containing optical glass with a refractive index ($n_d$) being in the range of from about 1.57 to about 1.59 and an Abbe number ($v_d$) being in the range of from about 48 to about 52, said zinc-containing optical glass consisting of, on an oxide basis, the composition of:

| Material | Percentage by weight |
|---|---|
| $SiO_2$ | 41–50 |
| ZnO | 30–40 |
| PbO | 0–1 |
| sum of ZnO + PbO | 31–41 |
| $Li_2O$ | 0–<3 |
| $Na_2O$ | 0–11 |
| $K_2O$ | 0–10 |
| sum of $Li_2O + Na_2O + K_2O$ | ≧2 |
| F | 0–3 |
| MgO | 0–6 |
| CaO | 0–<5 |
| SrO | 0–6 |
| BaO | 0–<0.9 |
| $B_2O_3$ | 0–<1 |
| $Al_2O_3$ | 0–<1.5 |
| $ZrO_2$ | 0–<2 |
| $Cs_2O$ | 0 to about 2.5; |

0 to about 5% by weight of one member of the group and combinations thereof: $Rb_2O$, $La_2O_3$, $Y_2O_3$, and $GeO_2$;
≧0% by weight of a coloring component; and
≧0% by weight of at least one refining agent.

10. The zinc-containing optical glass according to claim 2, wherein:
the light transmission of the glass, determined at a wavelength of 400 nm and a 25 mm specimen thickness, is at least about 0.98;
up to a total of about 1% by weight of said at least one refining agent is present; and
said at least one refining agent is at least one member of the group and combinations thereof: $As_2O_3$ and $Sb_2O_3$.

11. The zinc-containing optical glass according to claim 3, wherein:
the light transmission of the glass, determined at a wavelength of 400 nm and a 25 mm specimen thickness, is at least about 0.98;
up to a total of about 1% by weight of said at least one refining agent is present; and
said at least one refining agent is at least one member of the group and combinations thereof: $As_2O_3$ and $Sb_2O_3$.

12. The zinc-containing optical glass according to claim 4, wherein:
the light transmission of the glass, determined at a wavelength of 400 nm and a 25 mm specimen thickness, is at least about 0.98;
up to a total of about 1% by weight of said at least one refining agent is present; and
said at least one refining agent is at least one member of the group and combinations thereof: $As_2O_3$ and $Sb_2O_3$.

13. The zinc-containing optical glass according to claim 5, wherein:
the light transmission of the glass, determined at a wavelength of 400 nm and a 25 mm specimen thickness, is at least about 0.98;
up to a total of about 1% by weight of said at least one refining agent is present; and
said at least one refining agent is at least one member of the group and combinations thereof: $As_2O_3$ and $Sb_2O_3$.

14. The zinc-containing optical glass according to claim 6, wherein the light transmission of the glass, determined at a wavelength of 400 nm and a 25 mm specimen thickness, is at least about 0.98.

15. The zinc-containing optical glass according to claim 6, wherein:
up to about 8% by weight of said coloring component is present;
said coloring component is a member of the group and combinations thereof: CuO, $Cr_2O_3$, CoO, $Fe_2O_3$, MnO, NiO, and $V_2O_5$; and
said zinc-containing optical glass comprises an optical filter.

16. The zinc-containing optical glass according to claim 6, wherein:
up to a total of about 1% by weight of said at least one refining agent is present;
said at least one refining agent is at least one member of the group and combinations thereof: $As_2O_3$ and $Sb_2O_3$; and
said zinc-containing optical glass comprises an optical element.

17. The zinc-containing optical glass according to claim 7, wherein:
the light transmission of the glass, determined at a wavelength of 400 nm and a 25 mm specimen thickness, is at least about 0.98;
up to about 8% by weight of said coloring component is present;
said coloring component is a member of the group and combinations thereof: CuO, $Cr_2O_3$, CoO, $Fe_2O_3$, MnO, NiO, and $V_2O_5$; and
said zinc-containing optical glass comprises an optical filter.

18. The zinc-containing optical glass according to claim 7, wherein:
the light transmission of the glass, determined at a wavelength of 400 nm and a 25 mm specimen thickness, is at least about 0.98;
up to a total of about 1% by weight of said at least one refining agent is present;
said at least one refining agent is at least one member of the group and combinations thereof: $As_2O_3$ and $Sb_2O_3$; and said zinc-containing optical glass comprises an optical element.

19. The zinc-containing optical glass according to claim 8, wherein:

the light transmission of the glass, determined at a wavelength of 400 nm and a 25 mm specimen thickness, is at least about 0.98;

up to about 8% by weight of said coloring component is present;

said coloring component is a member of the group and combinations thereof: $CuO$, $Cr_2O_3$, $CoO$, $Fe_2O_3$, $MnO$, $NiO$, and $V_2O_5$; and said zinc-containing optical glass comprises an optical filter.

20. The zinc-containing optical glass according to claim 8, wherein:

the light transmission of the glass, determined at a wavelength of 400 nm and a 25 mm specimen thickness, is at least about 0.98;

up to a total of about 1% by weight of said at least one refining agent is present;

said at least one refining agent is at least one member of the group and combinations thereof: $As_2O_3$ and $Sb_2O_3$; and said zinc-containing optical glass comprises an optical element.

21. The zinc-containing optical glass according to claim 9, wherein:

the light transmission of the glass, determined at a wavelength of 400 nm and a 25 mm specimen thickness, is at least about 0.98;

up to about 8% by weight of said coloring component is present;

said coloring component is a member of the group and combinations thereof: $CuO$, $Cr_2O_3$, $CoO$, $Fe_2O_3$, $MnO$, $NiO$, and $V_2O_5$; and said zinc-containing optical glass comprises an optical filter.

22. The zinc-containing optical glass according to claim 9, wherein:

the light transmission of the glass, determined at a wavelength of 400 nm and a 25 mm specimen thickness, is at least about 0.98;

up to a total of about 1% by weight of said at least one refining agent is present;

said at least one refining agent is at least one member of the group and combinations thereof: $As_2O_3$ and $Sb_2O_3$; and said zinc-containing optical glass comprises an optical element.

\* \* \* \* \*